United States Patent
Ploug-Soerensen et al.

(10) Patent No.: US 7,027,936 B2
(45) Date of Patent: Apr. 11, 2006

(54) METHODS FOR MEASURING FLOW BY MEANS OF AN ULTRA SONIC FLOW METER

(75) Inventors: Lars Ploug-Soerensen, Nordborg (DK); Joergen Krusborg, Soenderborg (DK); Lars Jespersen, Soenderborg (DK); Esben Groenborg Brun, Soenderborg (DK)

(73) Assignee: Siemens Flow Instruments A/S, Nordborg (DK)

( * ) Notice: Subject to any disclaimer, the term of this patent is extended or adjusted under 35 U.S.C. 154(b) by 0 days.

(21) Appl. No.: 10/606,567

(22) Filed: Jun. 26, 2003

(65) Prior Publication Data

US 2004/0030509 A1    Feb. 12, 2004

(30) Foreign Application Priority Data

Jun. 30, 2002    (DK) .............................. 2002 01018

(51) Int. Cl.
  *G01F 1/66*    (2006.01)

(52) U.S. Cl. .................. 702/48; 702/51; 73/861.27

(58) Field of Classification Search ................. 702/48, 702/50, 51; 73/861.28, 861.27
See application file for complete search history.

(56) References Cited

U.S. PATENT DOCUMENTS 6,584,861 B1 *  7/2003  Jespersen .............. 73/861.27
6,772,643 B1 *  8/2004  Eguchi et al. .......... 73/861.28

FOREIGN PATENT DOCUMENTS

JP    2002-318145    *  4/2001

* cited by examiner

*Primary Examiner*—Kamini Shah
(74) *Attorney, Agent, or Firm*—McCormick, Paulding & Huber LLP

(57)    ABSTRACT

In a method for measuring flow by means of an ultra sonic flow meter, an ultra sonic signal is transmitted in an upstream and a downstream direction. This is measured upon receipt of an ultra sonic signal and the measurement stopped at a stopping point. A first series of transmissions is made, and the starting time of each transmission is incremented or decremented until a time difference between the upstream and downstream signal is inside a reference band. Flow is then calculated in accordance with the time measurements.

10 Claims, 5 Drawing Sheets

METHODS FOR MEASURING FLOW BY MEANS OF AN ULTRA SONIC FLOW METER

CROSS-REFERENCE TO RELATED APPLICATIONS

This application is entitled to the benefit of and incorporates by reference essential subject matter disclosed in Danish Patent Application No. PA 2002 01018 filed on Jun. 30, 2002.

FIELD OF THE INVENTION

The invention concerns a method for measuring flow by use of an ultra sonic flow meter. More specific, the invention is directed to a method of measuring transmission times of, and time difference between, an upstream and a downstream ultra sonic signal.

BACKGROUND OF THE INVENTION

The time difference between an upstream and a downstream ultra sonic signal is proportional to the flow, and used in time of flight ultra sonic meters as a measure of the flow. If the time difference Δt becomes longer than the duration of the period of the ultra sonic signal, an exact detection of the time difference becomes difficult due to the signal periodicity. In order to avoid this problem, known solutions provide detection circuits that are practically independent of the extent of Δt, i.e. the detection circuit makes measurement possible on ultra sonic flow meters, which have a Δt longer than the period of the signal. An example of such a prior art detection method and circuit—also called a trigger—is described in the following, where the envelope of the upstream and downstream signal play a significant role.

The basic purpose of a trigger in a transmit time ultrasonic flow meter is to "point" out the time of arrival of the ultrasonic signal. This is used to measure both the difference between the upstream and downstream transmission time and to measure the two transmission times. From these values the flow Q can be calculated according to (1):

$$Q = k \cdot \frac{\Delta t}{t_1 \cdot t_2} \quad (1)$$

where Δt is the difference time, $t_1$ and $t_2$ the transmission times and "k" is a constant dependent on the geometry of the tube. If the media is known, the measurement of the two transmission times can be replaced by measuring the media temperature and calculating the sound speed C from knowledge of the variation of the speed of sound with temperature:

$$Q = k \cdot \Delta t \cdot C^2 \quad (2)$$

where Q is the flow, k is a constant, Δt the time difference and C the sound speed.

FIG. 1 is an illustration of the receive signals—the first arriving is the result of the sound pulse travelling in the flow direction, 1, and the second is the result of the sound pulse travelling against the flow direction, 2. In the following the term zero crossing will be used, in practical implementations this will be signal zero (the middle of the range of voltage used in the implementation) or some value either a little over or under the signal zero. Still referring to FIG. 1, the basic problem is to trig or initiate the time measuring circuit with the "same" zero crossing in the upstream and the downstream sound pulse, otherwise a wrong Δt is measured. P1 and P2 are to be imagined as same zero crossings because each have a distance of 3½ periods from reception of the sound pulse. Also indicated in the Figure is the period $t_{sig}$ of the sound signal and the time difference Δt.

FIG. 2 shows how a prior art ultra sonic flowmeter uses the envelope of the ultrasonic signal to achieve a zero crossing detection that is independent of the length of Δt. The incoming signal (S1) is rectified (B1) and the result is (S2). This signal (S2) is fed through a band pass filter with non-minimum phase behaviour (B2). Non-minimum phase systems have the transient property that their initial direction of response is in the opposite direction of the final value—as a consequence, if the filter parameters are chosen appropriately, the output of the filter (B2) will have a well defined zero crossing indicating the receive time. Furthermore this zero crossing will be independent of the amplitude of the receive signal. The signal on the output of the filter is seen as (S3). The zero crossing of the signal (S3) is detected by the zero cross detector (B3), this signal (S4) is arming the zero cross detector (B4). After arming the zero cross detector (B4), the next positive or negative, dependent on the actual implementation), zero crossing in the original receive signal (S1) is detected by (B4) resulting in the signal (S5). The time where the signal (S5) changes from low to high is measured relative to the time of the transmit burst (or relative to another time with a known relation to the transmit time). If the time between the zero crossing of S3 and the following zero crossing of S1 is very short, there is a risk of detecting two different zero crossings of S1, due to random noise. To avoid this situation it is detected if the two zero crossings are too close, and if this is the case, the transmit signal is inverted—and hence the receive signal. The consequence of the inverted receive signal is that the previously very short time difference between S3 and S1 is now close to one half period of the receive signal. One can chose to measure transit time on the signal zero crossing (S5) or on the zero crossing of the signal (S4). After having calculated a time as described above for an upstream signal, the same procedure is used on the downstream signal. From these two times, a difference time is established and the flow Q calculated.

The described detection method works well in systems were the span of Δt is unknown. This is the case for a general purpose ultra sonic flow meter as the one described above, which are used for a variety of tubes having different diameters. This type of ultra sonic flow meters must be able to cope with a very wide span of Δt. However, in some systems, the span of Δt is limited by fluid velocity and/or the mechanical arrangement of the ultra sonic transducers which means that the ultra sonic converter can be designed according to other and less demanding principles. Such a limitation in Δt is the case, if the two ultra sonic transducers mounted in the tube are very close to each other. It will then be known that Δt e.g. will have a maximum value of e.g. 1 μs. Further, a drawback of the prior art design described above is the relatively extensive and thus costly use of electronic circuitry. Another weakness of the method is the dependence on a stable signal envelope. If for instance a single pulse in the receive signal has a lower amplitude due to electrical noise or particles/air bubbles in the liquid, the envelope form changes, and consequently a wrong Δt will be calculated.

Based on the foregoing, the object of the invention is to provide a detection method which is realized in a simpler way and with fewer electronic components, and still gives a reliable statement as to the difference in transmission time, $\Delta t$.

SUMMARY OF THE INVENTION

The basic idea of the invention is that of trial and error. During the first series of transmissions, multiple transmissions are performed, each transmission consisting of an ultra sonic signal in the downstream and upstream direction. The starting time of time measurement in the first series of transmissions is based upon a good estimate of when the incoming ultra sonic pulse arrives. If $\Delta t$ is inside the reference band, the starting time chosen was appropriate. If not, a second transmission is launched, but this time the starting time is incremented or decremented by an amount, thus raising the chances of success. These transmissions are repeated until $\Delta t$ is inside the reference band. The ideal case is the one in which the initial estimate of the starting time corresponds to the optimum. In this case, only one transmission will be performed. The method is especially applicable in ultra sonic flow meters having small $\Delta t$'s. Advantageously, the inventive trigger method makes it possible to dispense with much of the trigger hardware, hereby lowering the cost. Compared to FIG. 2, electronic circuits B1 and B2 can be omitted. The method has the further advantage, that it is simple to implement and very robust. Thus, the method is practically independent of signal distortions, because it is based on the detection of zero crossings.

Following the first series of transmissions and having placed $\Delta t$ within the reference band, a second series of transmissions can be launched. Though the method of using a first series of transmissions suffices to make a correct calculation of $\Delta t$ and flow Q, an improvement is reached by introducing a second series of transmissions sequentially following the first series. The second series remedy problems of variations in the travel time and thus changed zero crossings of the received ultra sonic signal due to varying temperatures of the liquid media. The second series of transmissions is repeated until the time period between the starting time and a stopping time of the time measurement is approximately equal to a multiple (1, 2, 3 . . . ) of half the time period of the ultra sonic signal. However, a full time period of the ultra sonic signal is preferred as reference value. The use of half the time period as reference can be preferred if a time circuit with no unlinearities is used. The idea of this second measure in the inventive method is to keep the average time from the starting time to the stopping time constant, hereby positioning the starting and stopping times in an optimum position independent of temperature changes in the media.

Advantageously, the first and second series of transmissions can be supplemented by a third series, where the starting time is incremented or decremented until a difference between a calculated average transmission value and a reference value is inside a reference band. The reference value is determined as a function of the media temperature, and the temperature is either measured or calculated.

The incrementation or decrementation of the starting signal in the third series of transmissions is preferably done in steps with a resolution in time that approximately corresponds to the period of the received signal. A slight variation in the period of the received signal is normal due to differences in temperature on the transducers, thus +/−40 kHz on a 1 MHz transmitted signal is to be expected, but in practice this has no influence. Thus a resolution departing by a small amount of the period time can be used.

In relation to the first transmission series, the timely resolution used in positioning the starting time corresponds to the timely resolution of a digital control unit.

The time measurements, initiated at the starting time, may be stopped at the first positive or negative zero crossing of the received ultra sonic signal, but this demands the use of fast electronic circuits. It is preferred, that the time measurement is stopped at the first positive zero crossing following a negative zero crossing of the received ultra sonic signal, because it allows the currents and voltages in the electronics to settle, thus avoiding unlinearities. Of course the order can be changed into stopping on a negative zero crossing following a positive.

It is preferred, that the starting time in the first transmission in the first series of transmissions is a fixed value which may be stored in a memory. The fixed starting time is chosen to start approximately in the middle or in the first half of the receiving train of pulses, which ensures a signal with sufficient amplitude for measuring.

The reference band of the first series of transmissions is delimited by $\Delta t_{max}$ and $\Delta t_{min}$ and the width of the band is smaller than the time period of the ultra sonic receive signal. Preferably, the reference band is narrowed by adding a safety margin to the reference band. The safety margin consists at least of the timely resolution, but may also comprise a duration of a timing noise. By incorporating a safety margin into the reference band, increased stability of the method is achieved.

BRIEF DESCRIPTION OF THE DRAWINGS

The invention will now be described on the basis of the figures, where.

DETAILED DESCRIPTION OF THE PREFERRED EMBODIMENTS

The following preferred embodiment describes a trigger scheme for ultrasonic flow meters used for measuring media with a known relation between the sound speed and the temperature of the media, and in which the difference time, $\Delta t$, between signals transmitted upstream and downstream is limited to be within one period, $t_{sig}$, or less of the received ultrasonic signal (i.e. within approximately 1 μs for the most commonly applied ultrasonic transducers).

Figure 1:
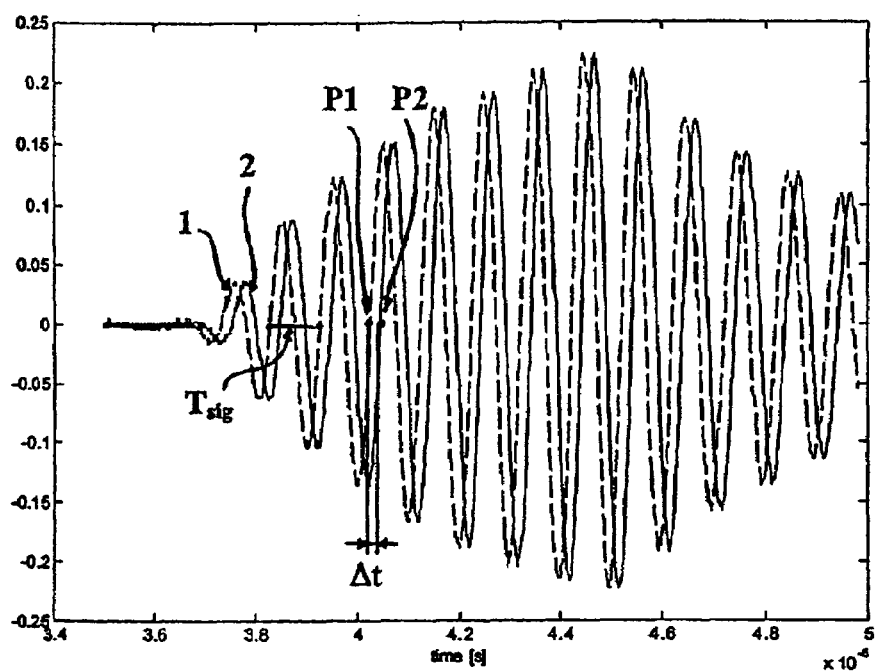
FIG. 1 is a time-amplitude diagram of an upstream and a downstream signal travelling in a media in a tube and generated by ultrasonic transducers.
Figure 3:
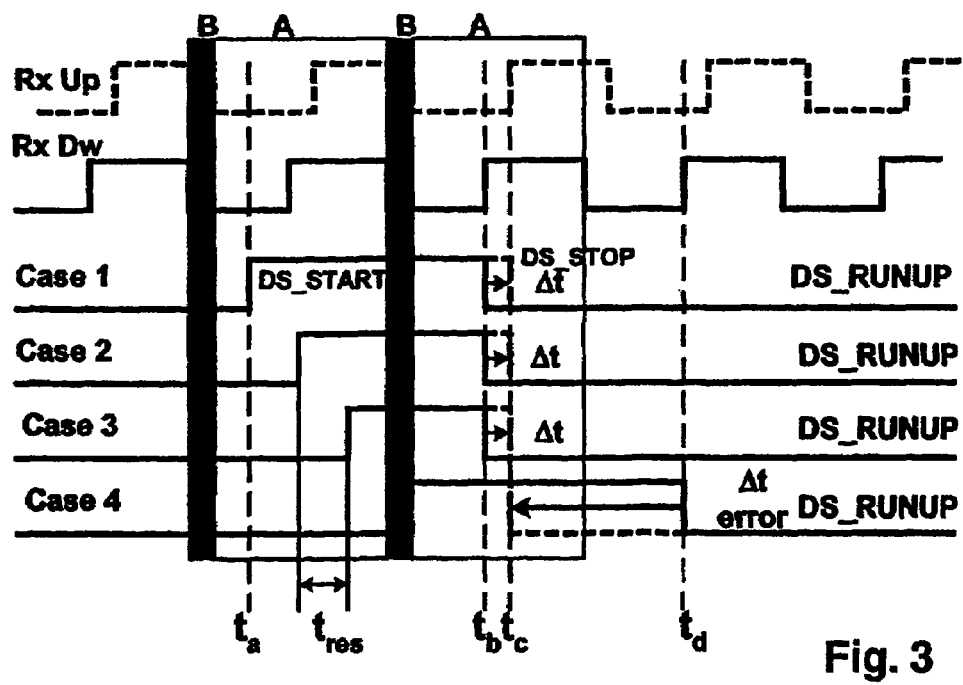
FIG. 3 is a time-pulse diagram according to the invention.
Figure 2:
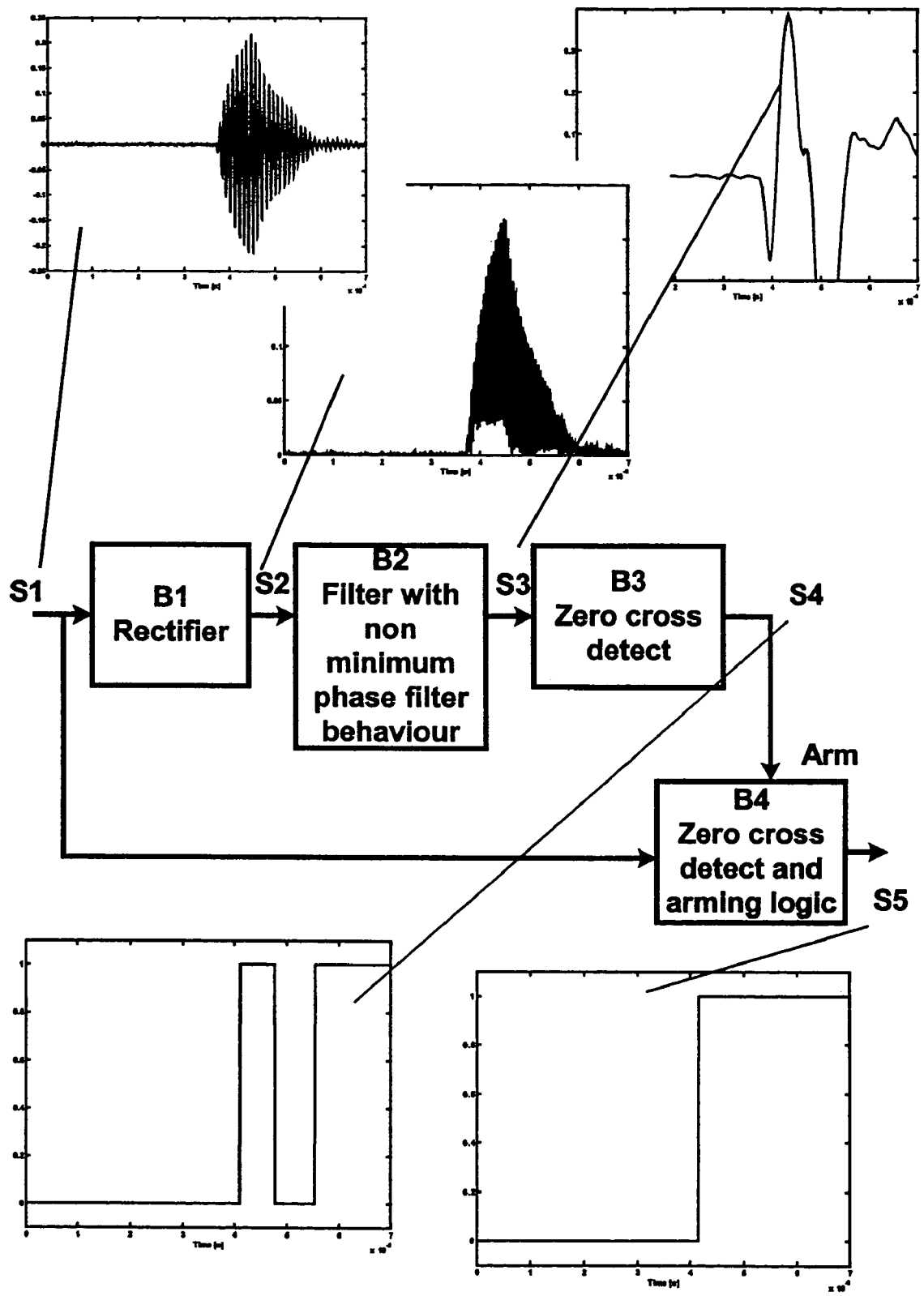
FIG. 2 shows a prior art detection scheme used for finding $\Delta t$.

Referring to FIG. 3, at both the upstream and downstream receive signal, the following sequence is executed:

1) At some instant a signal DS_START, starts the time measurement system. The time of DS_START has a known relation to the transmit time, and must be within the body of the receive signal.
2) The measurement system is stopped by DS_STOP, which is the first positive going edge following a negative going edge in the receive signal. By using the negative going edge to qualify the positive going edge as the stop signal, the time measurement system is always assured to have a minimum measurement time of one half period of the receive signal, thereby avoiding otherwise possible nonlinearities of the measurement system and arming logic, when measuring time intervals close to zero.

FIG. 3 shows four different trigger cases, 1–4. For clarity, only the digitized signals of the ultrasonic receive signal bursts (RX_UP (dashed line) and RX_DOWN) are shown. The signals shown correspond to positive flow, i.e. flow in the direction where the downstream signal is faster than the upstream signal. For each of the four cases, the resulting input signal (DS_RUNUP) to the time measurement system is shown. The positive going edge of the DS_RUNUP signal corresponds to DS_START, and the negative going edges corresponds to the DS_STOP signals generated for each up- and downstream measurement. In cases 1–3 the correct $\Delta t$ is measured as indicated by the $\Delta t$ arrows. Taking case 1 as example, after generating the send signal in the down stream direction a timer is started at time $t_a$ (initially at the time DS_START_INI) and stopped $t_b$ when a negative flank is followed by a positive flank in RX_DW. Now the downstream transmission time has been measured.

After generating the send signal in the upstream direction a timer is started at time $t_a$ and stopped at $t_c$ when a negative flank is followed by a positive flank in RX_UP. Now the up stream transmission time has been measured. Subtracting the downstream time from the upstream time returns a positive value of $\Delta t$. However, in case 4, the timing of DS_START results in an erroneous measurement of $\Delta t$ because the counter is not stopped until $t_d$. $\Delta t$ becomes negative as indicated with the arrow pointing in the opposite direction of the arrow in case 1. Thus, as different zero crossings of the upstream and downstream signals are compared to each other, this measurement must be discarded.

The valid range for DS_START in the figure is denoted with letter A, and the invalid ranges are denoted with letter B. As the flow-rate increases, the A-ranges decreases, and the B-ranges increase correspondingly, leaving only the start position in case 2 as valid when the displacement between the measurements has reached the maximum value of one signal period. In order to be able to distinguish between valid and invalid measurements, the span of $\Delta t$ must be limited to less than the signal period, $t_{sig}$. The following is observed:

The maximum measurement range: $\Delta t_{span} = \Delta t_{max} - \Delta t_{min} < t_{sig}$.

At positive flow an erroneous measurement results in a measured $\Delta t$ of: $\Delta t_{meas} = \Delta t - t_{sig}$.

At negative flow an erroneous measurement results in a measured $\Delta t$ of: $\Delta t_{meas} = \Delta t + t_{sig}$.

However, when repositioning the starting time, there are some practical limitations to take account of. First, the DS_START instant can only be adjusted with a minimum resolution of $t_{res}$ as indicated in FIG. 3, typically dictated by the clock resolution of a microcontroller. A typical resolution is 250 ns for a microcontroller running a 4 MHz clock speed. Second, the peak to peak timing noise, $t_n$, as measured on the qualifying (negative going) edge of the receive signal (RX_UP/RX_DOWN), relative to DS_START (the noise is partly thermal noise from the circuitry, and noise induced by flow fluctuations).

This leads to the following practical constraints on the reference value:

| | |
|---|---|
| At positive flow, $\Delta t > 0$: | $\Delta t_{max} < t_{sig} - (t_{res} + t_N)$ |
| At negative flow, $\Delta t < 0$: | $-\Delta t_{min} < t_{sig} - (t_{res} + t_N)$ |

Figure 4:
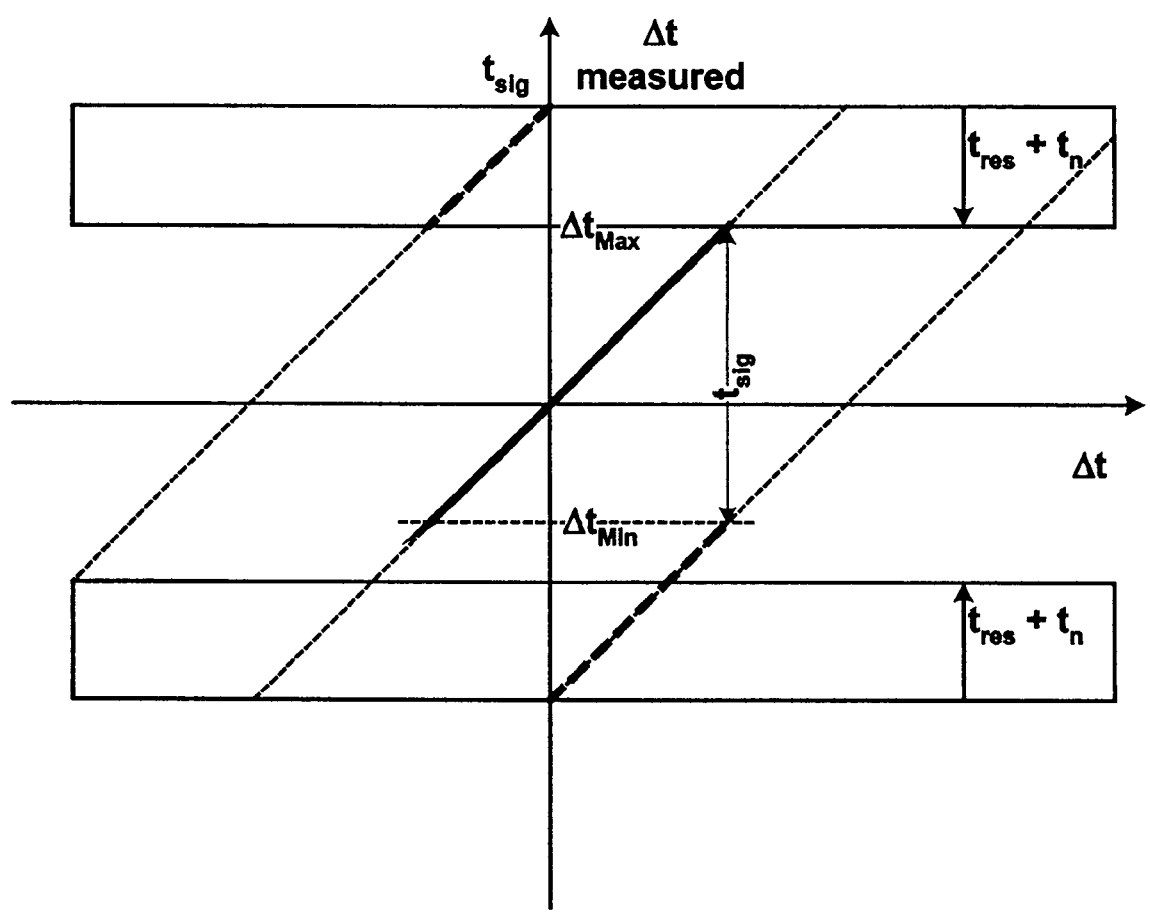
FIG. 4 shows the reference band of the time difference $\Delta t$ according to the invention.

FIG. 4 shows the relations between $\Delta t_{measured}$, $\Delta t_{max}$, $\Delta t_{min}$, $t_{res}$, $t_n$ and the true $\Delta t$. The unbroken curve corresponds to successful measurements of $\Delta t$, and the dashed curve corresponds to erroneous measurements of $\Delta t$, $\Delta t_{error}$. The boxes $t_{res}+t_n$ represents the above mentioned inequalities. Results are skipped if they are outside the limits of $\Delta t_{min}$ and $\Delta t_{max}$. Considering the case of $\Delta t_{max}$ as the limiting factor in FIG. 4, it is seen that the limited resolution of DS_START, $t_{res}$ and the noise $t_n$ allows for a similar amount of negative flow $\Delta t_{min}$, and vice versa. If $\Delta t_{min}$ is the limiting factor, the opposite will be the case.

The inventive trigger scheme has three different levels of action, which all perform adjustments on the DS_START value used for the following measurement. Before each pair of upstream and downstream measurements are performed, DS_START is calculated as:

$$DS\_START = DS\_START\_INIT + L1 + L2 + L3.$$

DS_START_INIT is the initial value of DS_START. L1, L2 and L3 are the adjustment results for each trigger level. The initial value is 0.

Level 1 of the trigger scheme is the basic trigger functionality which ensures that $\Delta t$ is measured on the same zero-crossing (relative to the signal start) in the upstream and downstream receive signals. The level 1 mechanism is as follows: If $\Delta t_{measured}$ is outside the interval $[\Delta t_{min}; \Delta t_{max}]$, L1 is incremented in steps of $t_{res}$, following the sequence: L1=(0-1-2... (n-1)-0-1-2 ...) x $t_{res}$, where n = round($t_{sig}/t_{res}$). I.e. L1 sweeps one period $t_{sig}$ of the receive signal.

The consequence of using only level 1 of the trigger is that, as the time of flight varies with media temperature, the signal zero-crossing used for measurement changes.

Level 2 of the trigger is only invoked after passing level 1 without adjustments. The purpose of level 2 is to keep the average time from DS_START to DS_STOP (i.e. DS_RUNUP) constant within the limits given by $t_{res}$. By choosing $t_{sig}$ as the target time for the average value of DS_RUNUP, the starting point DS_START is kept in the optimal position (corresponding to case 2 in FIG. 3), where the distance in time to the error trig ranges B is as long as possible.

The level 2 mechanism is as follows: Calculate the average of the measured upstream and downstream DS_RUNUP times. If the average DS_RUNUP differs from $t_{sig}$ by more than $\pm t_{adj}$, L2 is adjusted up or down accordingly, in steps of $t_{res}$. The limit for adjustment $t_{adj}$ is based upon $t_{res}$, and should be bigger than $t_{res}/2$, because an adjustment smaller than $t_{res}$ in unwanted manner would increase the distance to the optimal point.

With the level 2 part of the trigger scheme implemented, the trigger point will track the received signal, as long as there are no signal drop-outs. To be able to track the signal in all cases, the third level of the trigger is invoked.

Level 3 of the trigger is only invoked after passing level 2 without adjustments. The purpose of level 3 is to track a certain zero-crossing in the receive signal, at all media temperatures. The measured media temperature and the relation of sound speed to media temperature, is used to calculate the expected average transmission time from transmit to receive.

The level 3 mechanism is as follows: The directly measured average transmission time (DS_START+ DS_RUNUP−SIGNAL_OFFSET(*)) is compared to the expected transmission time from the temperature measurement. If the comparison is outside the limits of $\pm t_{sig}/2$, L3 is adjusted up or down accordingly, in steps of $t_{sig}$.

((*) SIGNAL_OFFSET is the distance from the receive signal start to preferred signal zero-crossing).

Figure 5:
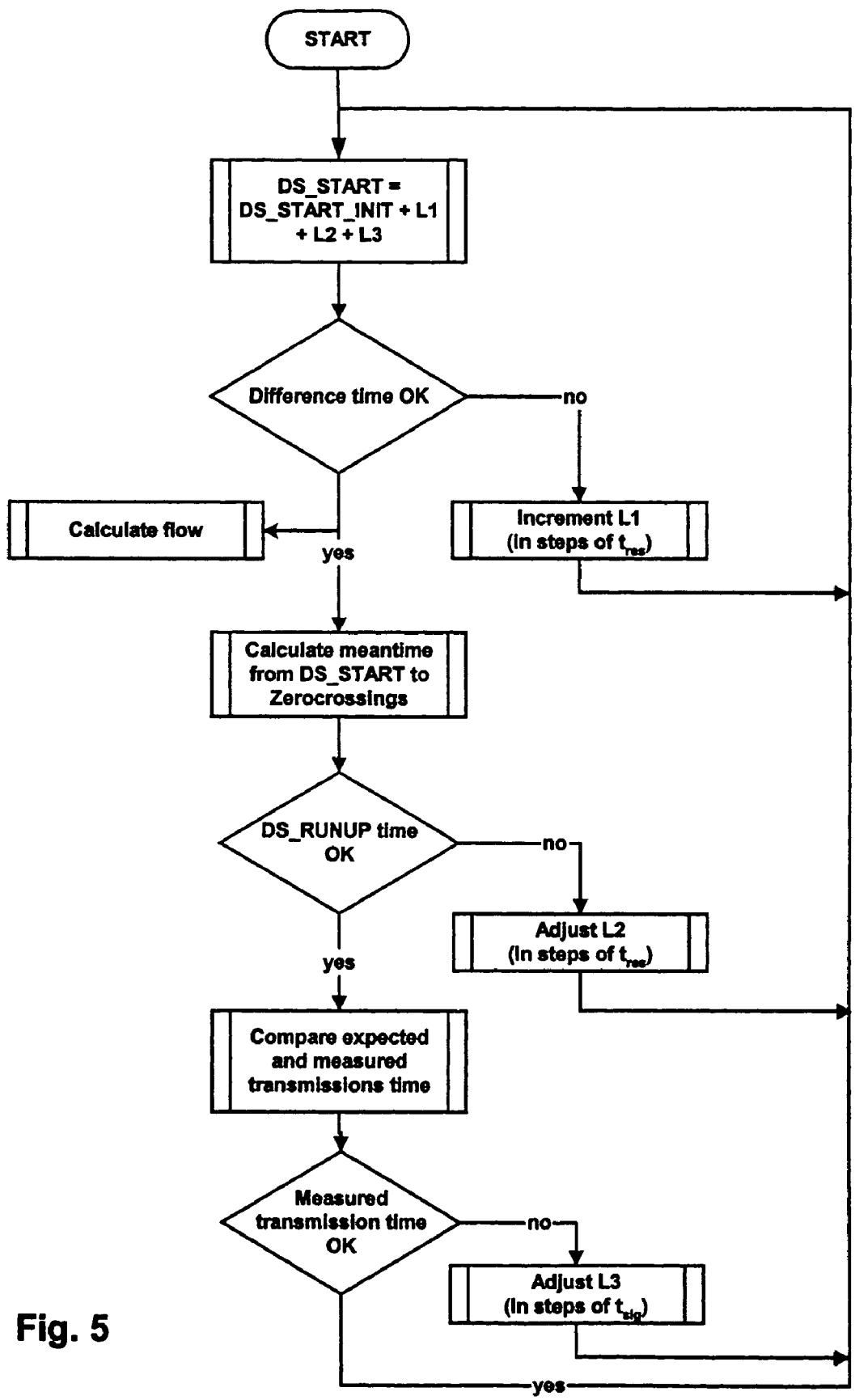
FIG. 5 shows a flow chart according to the invention

Besides the result of tracking a constant zero-crossing in the signal, level 3 gives the extra benefit, that it is now possible to use the measured transmission time in the flow calculation instead of using the transmission time measured indirectly via temperature. This allows the temperature measurement to be rather crude without inflicting the flow measurement. A flow chart describing the three levels is found in FIG. 5.

Figure 6:
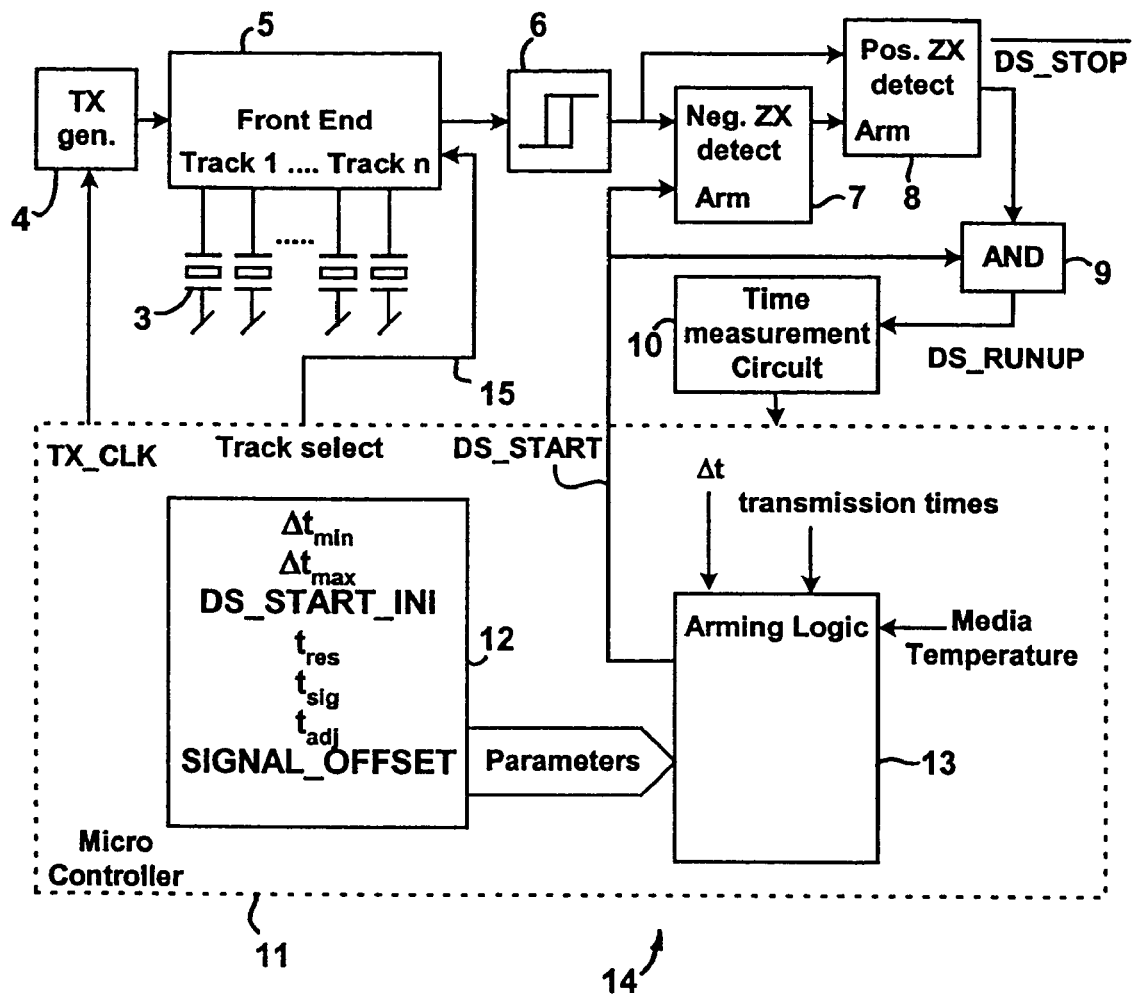
FIG. 6 is a block diagram of the preferred embodiment of the invention.

FIG. 6 is a block diagram of the preferred embodiment 14 of an ultra sonic flow meter. A generator 4 generates an exitation pulse for a front end 5. To this circuit ultra sonic transducers 3 are connected. From front end 5 the ultra sonic receive signals are passed to a comparator 6, which converts the analog signals into digital signals. A first flip flop 7 and a second flip flop 8 receives the digital pulses. The second flip flop 8 is armed by the output of the first flip flop, and the first flip flop 7 is armed by the signal DS_START coming from an arming logic 13 placed in a microcontroller 14. Inputs to the arming logic is the difference time Δt, two transmission times (t1, t2) and the media temperature. The difference time and the transmission times are fed from a time measurement circuit 10, which measures the width of DS_RUNUP, which is the difference between the starting signal DS_START and the stopping signal DS_STOP. DS_STOP (negated) is the output of the second flip flop 8 and fed to AND circuit 9. Box 12 shows the set of parameters that are used in the arming logic for the generation of the starting time DS_START. Track select 15 selects the set of transducers to use.

Due to the low, Δt unbalances in the generation of the upstream and downstream signals must be avoided. Such differences may occur if two different electronic send and receive circuits are used, where component tolerances cause differences in the group run time of the signals. Even small differences will have a huge error impact on ultra sonic systems using small Δt. In order to overcome this problem a circuit as described in DE 100 48 959 A1 is used as front end 5. This circuit uses one and the same electronic components for send and receive, thus neither component tolerances nor temperature differences influence on Δt.

The span of the typical reference band in this embodiment is −20 ns up to 600 ns. If the measured Δt falls outside of this span, the measurement is skipped.

What is claimed is:

1. A method for measuring flow by means of an ultra sonic flow meter, the method comprising the steps of transmitting an ultra sonic signal in an upstream and a downstream direction, initiating a time measurement at a starting time upon receipt of the ultra sonic signal, and stopping the time measurement at a stopping time making a first series of transmissions where the starting time in each transmission is incremented or decremented until a time difference (Δt) between the upstream and downstream signal is inside a reference band ($\Delta t_{span}$) and calculating the flow based on the time measurements.

2. A method according to claim 1, including the further step of generating a second series of transmissions following the first transmissions, where the starting time in each transmission is incremented or decremented until the time period (DS_RUNUP) between the starting time (DS_START) and the stopping time (DS_STOP) is approximately equal to a multiple of half the time period of the ultra sonic signal, but preferably equal to the time period.

3. A method according to claim 2, including the further step of generating a third series of transmissions following the first and second series of transmissions, incrementing or decrementing the starting time in the third series of transmissions until a difference between a calculated average transmission time and a transmission time reference value determined on the basis of the media temperature is inside a reference band.

4. A method according to claim 3, wherein the incrementation or decrementation during the third series of transmissions is done in steps of a timely resolution ($t_{sig}$) that is approximately equal to the period of the received signal.

5. A method according to claim 1, wherein the incrementation or decrementation is done in steps of a timely resolution ($t_{res}$) defined by the resolution of the microcontroller.

6. A method according to claim 1, wherein following the starting time, the time measurement is stopped at a first positive zero crossing of the received ultra sonic signal or at a first negative zero crossing.

7. A method according to claim 1, wherein following the starting time, the time measurement is stopped at a first positive zero crossing following a negative zero crossing of the received ultra sonic signal, or vice versa.

8. A method according to claim 1, wherein the starting time in the first transmission in the first series of transmissions is a fixed value (DS_START_INI).

9. A method according to claim 2, wherein the reference band ($\Delta t_{span}$) is delimited by a maximum difference time ($\Delta t_{max}$) and a minimum difference time ($\Delta t_{min}$), the width of the band being smaller than the time period ($t_{sig}$) of the ultra sonic receive signal.

10. A method according to claim 9, wherein a safety margin is added to the reference band, the safety margin corresponding to at least the timely resolution ($t_{res}$) of the incrementing or decrementing steps, and preferably the sum of a resolution and the duration of a liming noise ($t_n$).

* * * * *

UNITED STATES PATENT AND TRADEMARK OFFICE
CERTIFICATE OF CORRECTION

PATENT NO. : 7,027,936 B2 Page 1 of 1
APPLICATION NO. : 10/606567
DATED : April 11, 2006
INVENTOR(S) : Lars Ploug-Soerensen et al.

It is certified that error appears in the above-identified patent and that said Letters Patent is hereby corrected as shown below:

Title page,
Item [54], Title, should read -- METHOD FOR MEASURING FLOW BY MEANS OF AN ULTRA SONIC FLOW METER --.

Column 8,
Line 46, delete "claim 2" and replace with -- claim 1 --.
Line 55, delete "liming" and replace with -- timing --.

Signed and Sealed this

Fourth Day of July, 2006

JON W. DUDAS
*Director of the United States Patent and Trademark Office*